United States Patent
Perreault et al.

(10) Patent No.: US 10,678,056 B2
(45) Date of Patent: Jun. 9, 2020

(54) AUGMENTED REALITY LIGHT FIELD HEAD-MOUNTED DISPLAYS

(71) Applicant: Google LLC, Mountain View, CA (US)

(72) Inventors: John D. Perreault, San Jose, CA (US); Patrick Llull, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/905,192

(22) Filed: Feb. 26, 2018

(65) Prior Publication Data

US 2019/0265477 A1 Aug. 29, 2019

(51) Int. Cl.
| | |
|---|---|
| *G02B 27/01* | (2006.01) |
| *F21V 8/00* | (2006.01) |
| *G02B 5/30* | (2006.01) |
| *G02B 27/14* | (2006.01) |
| *H04N 13/334* | (2018.01) |
| *G02B 3/00* | (2006.01) |
| *H04N 13/307* | (2018.01) |
| *H04N 13/344* | (2018.01) |
| *G02B 27/09* | (2006.01) |

(52) U.S. Cl.
CPC ....... *G02B 27/0172* (2013.01); *G02B 3/0056* (2013.01); *G02B 5/3058* (2013.01); *G02B 5/3083* (2013.01); *G02B 6/0038* (2013.01); *G02B 27/0983* (2013.01); *G02B 27/14* (2013.01); *H04N 13/307* (2018.05); *H04N 13/334* (2018.05); *H04N 13/344* (2018.05); *G02B 2027/0134* (2013.01); *G02B 2027/0136* (2013.01); *G02B 2027/0174* (2013.01); *G02B 2027/0178* (2013.01)

(58) Field of Classification Search
CPC ........ G02B 2027/0174; G02B 27/0172; G02B 27/14; G02B 5/3058; G02B 5/3083; G02B 6/0038; G02B 27/30; G02B 2027/0134; G02B 2027/0136; G02B 2027/0178; G02B 27/0983; G02B 3/0056; H04N 13/307; H04N 13/334; H04N 13/344

See application file for complete search history.

(56) References Cited

U.S. PATENT DOCUMENTS

| 8,941,559 B2 | 1/2015 | Bar-Zeev et al. | |
|---|---|---|---|
| 2013/0314793 A1* | 11/2013 | Robbins | G02B 5/18 359/573 |

(Continued)

OTHER PUBLICATIONS

International Search Report and Written Opinion dated Aug. 19, 2019 for corresponding International Application No. PCT/US2019/015613, 17 pages.

(Continued)

*Primary Examiner* — Dmitriy Bolotin

(57) ABSTRACT

A near-eye display system includes a transmissive display panel to display a near-eye light field frame comprising an array of elemental images. The transmissive display panel is configured to transmit light rays of the near-eye light field frame away from the user's eye and towards an array of curved beam splitters. The curved beam splitters collimate the transmitted light rays and reflect the collimated light rays back towards the transmissive display panel for passing to the user's eye.

8 Claims, 7 Drawing Sheets

(56) References Cited

U.S. PATENT DOCUMENTS

| | | | |
|---|---|---|---|
| 2014/0168034 A1* | 6/2014 | Luebke | G06F 3/013 |
| | | | 345/8 |
| 2014/0268336 A1 | 9/2014 | Hiraide | |
| 2014/0340389 A1* | 11/2014 | Lannnan | G06T 15/04 |
| | | | 345/419 |
| 2017/0075120 A1 | 3/2017 | Wong et al. | |
| 2017/0214907 A1* | 7/2017 | Lapstun | H04N 13/302 |
| 2018/0084245 A1* | 3/2018 | Lapstun | G02B 27/0075 |
| 2018/0316935 A1* | 11/2018 | Boisson | H04N 19/597 |

OTHER PUBLICATIONS

Genevet, et al., "Recent advances in planar optics: From plasmonic to dieletric metasurfaces," Optica, vol. 4, No. 1, Jan. 2017, 14 pages.
Davies, "Meta 2 Augmented Reality Glasses Portend Brighter, Nearer Future," Tom's Hardwar, Mar. 2, 2016, <https://www.tomshardware.com/news/meta-2-augmented-reality-glasses,31314.html> Retrieved Mar. 17 2018, 7 pages.
"The World's First Holographic Head-Mounted Display," Microsoft HoloLens, <https://www.microsoft.com/en-us/hololens/hardware> Retrieved May 3, 2018, 5 pages.
Taiwanese Office Action with English Translation dated Jan. 6, 2020 for corresponding TW Application No. 108100488, 11 pages.

* cited by examiner

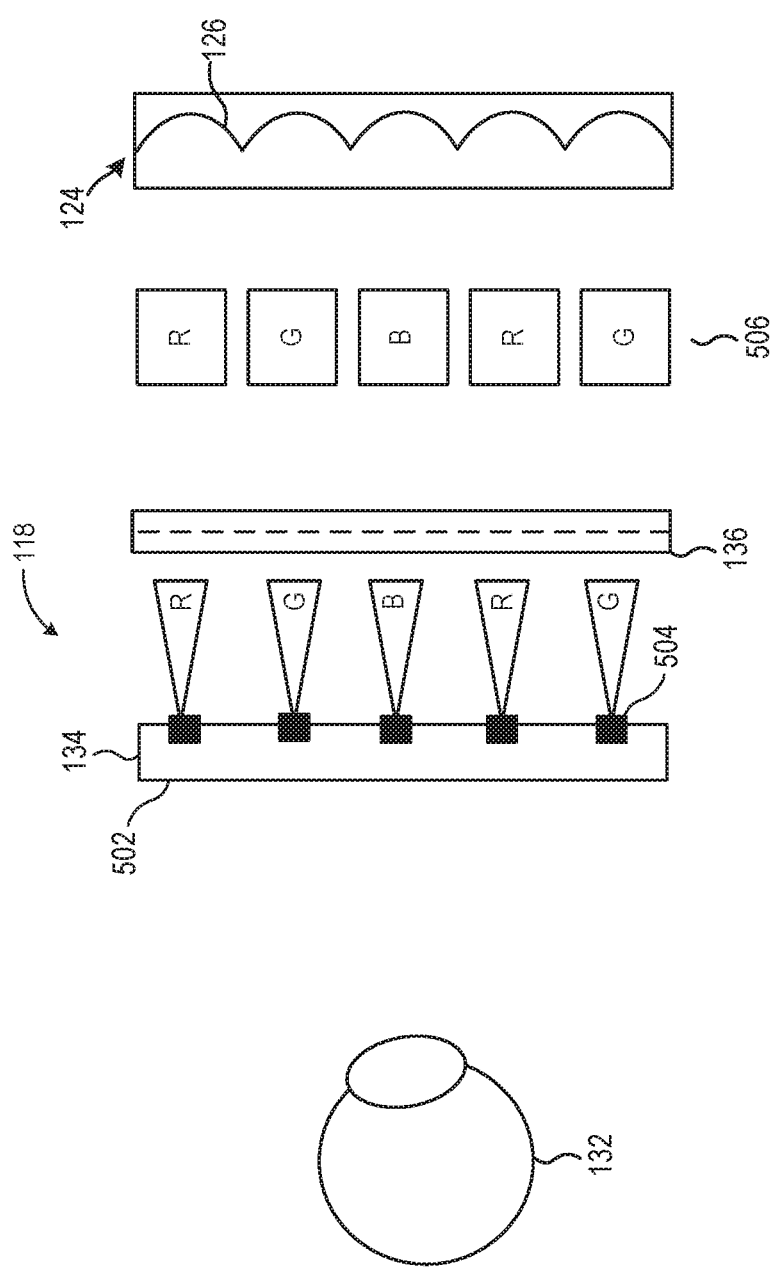

US 10,678,056 B2

AUGMENTED REALITY LIGHT FIELD HEAD-MOUNTED DISPLAYS

BACKGROUND

Head-mounted displays (HMDs) and other near-eye display systems can utilize a lightfield display or other computational display to provide effective display of three-dimensional (3D) graphics. Generally, the lightfield display employs one or more display panels and an array of lenslets, pinholes, or other optic features that overlie the one or more display panels. A rendering system renders an array of elemental images, with each elemental image representing an image or view of an object or scene from a corresponding perspective or virtual camera position. In the case of HMDs, virtual objects can be superimposed on the visual the user views (e.g., a real world scene) to provide an augmented reality (AR) or mixed reality (MR) immersive experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a diagram of light field encoding with transmissive displays in accordance with some embodiments.

DETAILED DESCRIPTION

FIGS. 1-7 illustrate example systems for transparent light field AR displays in a near-eye display system. In at least one embodiment, the near-eye display system employs a computational display to display integral lightfield frames of imagery to a user so as to provide the user with an AR or MR experience. Each integral lightfield frame is composed of an array of elemental images, with each elemental image representing a view of an object or scene from a different corresponding viewpoint.

As the eyebox dimensions, or "size", for computational displays are proportional to the ratio of eye relief to focal length of optical elements, an attempt to increase eyebox size generally results in reduced field of view (FOV), and vice versa. To provide for an AR display with improved eyebox size without a corresponding reduction in FOV, in at least one embodiment the near-eye display systems described herein utilize transparent backlights, transparent display panels, and tiled optics to enable beam-splitting and near-eye reconstruction of a light field image on the retina. As an example, the near-eye display system may include a transmissive display panel to display a near-eye light field frame comprising an array of elemental images. The transmissive display panel is configured to transmit light rays of the near-eye light field frame away from the user's eye and towards an array of curved beam splitters. The curved beam splitters collimate the transmitted light rays and reflect the collimated light rays back towards the transmissive display panel (i.e., transparent) for passing to the user's eye. Thus, the use of transparent optical elements enables an increase in the path length traveled by light rays, and thus the FOV and eyebox size, without increasing the form factor of the near-eye display system.

Figure 1:
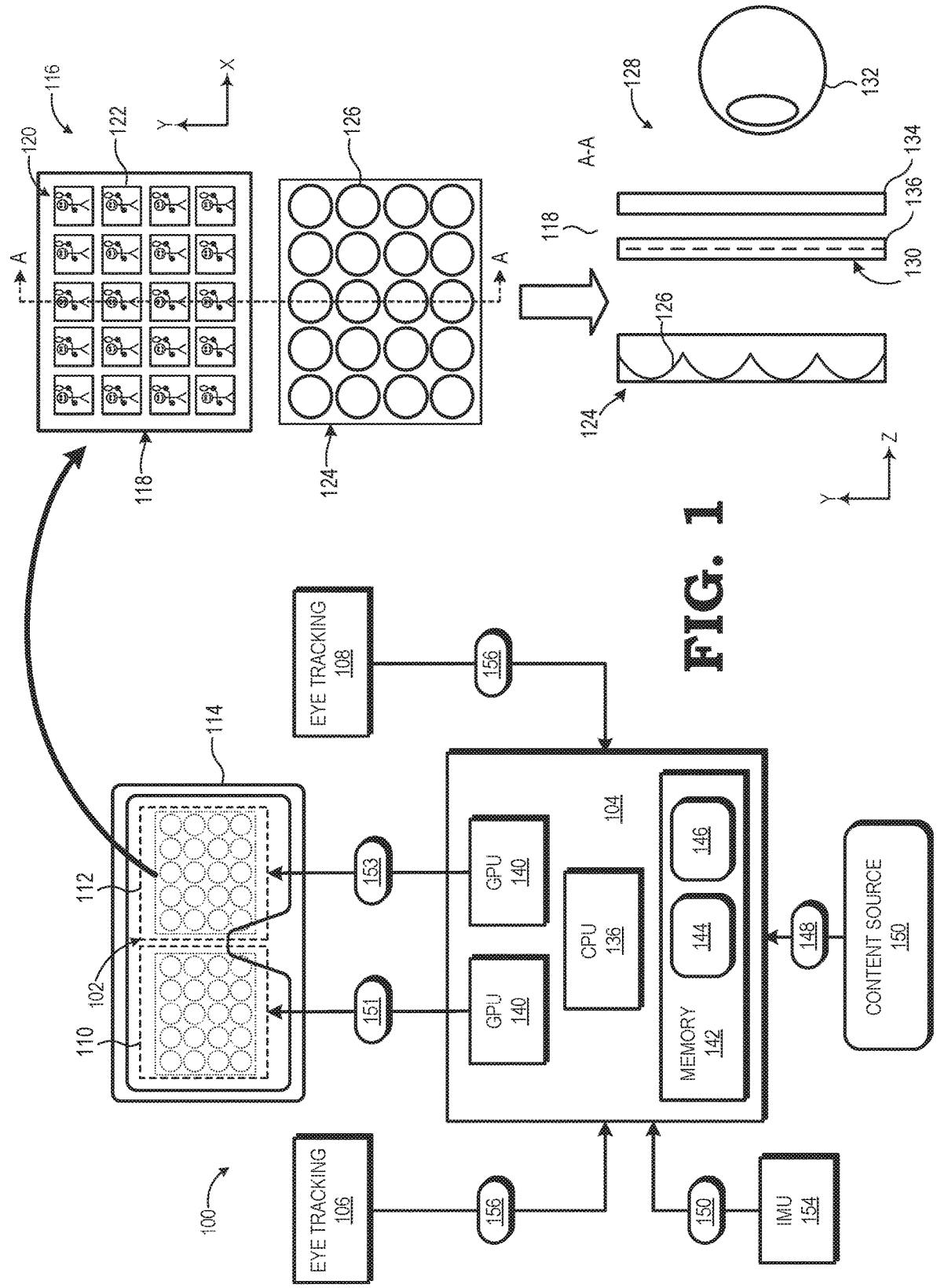
FIG. 1 is a diagram illustrating a near-eye display system incorporating backlit light field displays in accordance with some embodiments.

FIG. 1 illustrates a near-eye display system 100 incorporating backlit light field displays in accordance with some embodiments. In the depicted example, the near-eye display system 100 includes a computational display sub-system 102, a rendering component 104, and one or more eye tracking components, such as one or both of an eye tracking component 106 for tracking a user's left eye and an eye tracking component 108 for tracking the user's right eye. The computational display sub-system 102 includes a left-eye display 110 and a right-eye display 112 mounted in an apparatus 114 (e.g., goggles, glasses, other head-mounted display (HMD), etc.) that places the displays 110, 112 in front of the left and right eyes, respectively, of the user.

As shown by view 116, each of the displays 110, 112 includes at least one display panel 118 to display a sequence or succession of integral light field frames (hereinafter, "light field frame" for ease of reference), each of which comprises an array 120 of elemental images 122. For ease of reference, an array 120 of elemental images 122 may also be referred to herein as a light field frame. Each of the displays 110, 112 further includes an array 124 of beam splitters 126 overlying the display panel 118. In some embodiments, the number of beam splitters 126 in the beam splitter array 124 is equal to the number of elemental images 122 in the array 120, but in other implementations the number of beam splitters 126 may be fewer or greater than the number of elemental images 122. Note that while the example of FIG. 1 illustrates a 5×4 array of elemental images 122 and a corresponding 5×4 array 124 of beam splitters 126 for ease of illustration, in a typical implementation the number of elemental images 122 in a light field frame and the number of beam splitters 126 in the beam splitter array 124 typically is much higher. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

Cross-view 128 of FIG. 1 depicts a cross-section view along line A-A of the beam splitter array 124 overlying the display panel 118 such that the beam splitter array 124 overlies the display surface 130 of the display panel 118 such that the display panel 118 is disposed between the beam splitter array 124 and the corresponding eye 132 of the user. As discussed in further detail herein, the display panel 118 includes a transparent backlight 134 and a transmissive display panel 136. In this configuration, light is emitted from the display panel 118 (e.g., from the transparent backlight 134 and through the transmissive display panel 136) towards the beam splitter array 124, and each beam splitter 126 redirects (e.g., reflects) a corresponding region of the display surface 130 onto the pupil 134 of the eye, with each such region at least partially overlapping with one or more adjacent regions.

In such computational display configurations, when an array 120 of elemental images 122 is displayed at the display surface 130 of the display panel 118 and then redirected by the beam splitters 126 of the beam splitter array 124 towards the eye 132, the user perceives the array 120 of elemental images 122 as a single virtual image. When this process is performed in parallel for both the left eye and right eye of the user with the proper parallax implemented therebetween, the result is the presentation of autostereoscopic three-dimensional (3D) virtual imagery to the user. Additionally, light from the real world (e.g., a real world environment in which the user is situated) is passed through the beam splitter array 124, the transmissive display panel 136, and then the transparent backlight 134 towards the eye 132. Thus, virtual imagery is superimposed over, or otherwise combined with, real world imagery to present augmented-reality (AR) and/or mixed-reality (MR) imagery to the user.

As also shown in FIG. 1, the rendering component 104 includes a set of one or more processors, such as the illustrated central processing unit (CPU) 138 and graphics processing units (GPUs) 140 and one or more storage components, such as system memory 142, to store software programs or other executable instructions that are accessed and executed by the processors 138, 140 so as to manipulate the one or more of the processors 138, 140 to perform various tasks as described herein. Such software programs include, for example, rendering program 144 comprising executable instructions for a rendering process, as described below, as well as an eye tracking program 146 comprising executable instructions for an eye tracking process, as also described below.

In operation, the rendering component 104 receives rendering information 148 from a local or remote content source 150, where the rendering information 148 represents graphics data, video data, or other data representative of an object or scene that is the subject of imagery to be rendered and displayed at the display sub-system 102. Executing the rendering program 144, the CPU 138 uses the rendering information 148 to send drawing instructions to the GPUs 140, which in turn utilize the drawing instructions to render, in parallel, a series of lightfield frames 151 for display at the left-eye display 110 and a series of lightfield frames 153 for display at the right-eye display 112 using any of a variety of well-known VR/AR/MR computational light field rendering processes. As part of this rendering process, the CPU 138 may receive pose information 150 from an inertial management unit (IMU) 154, whereby the pose information 150 is representative of a current pose of the display sub-system 102 and control the rendering of one or more pairs of light field frames 151, 153 to reflect the viewpoint of the object(s) or scene(s) from the current pose.

Figure 2:
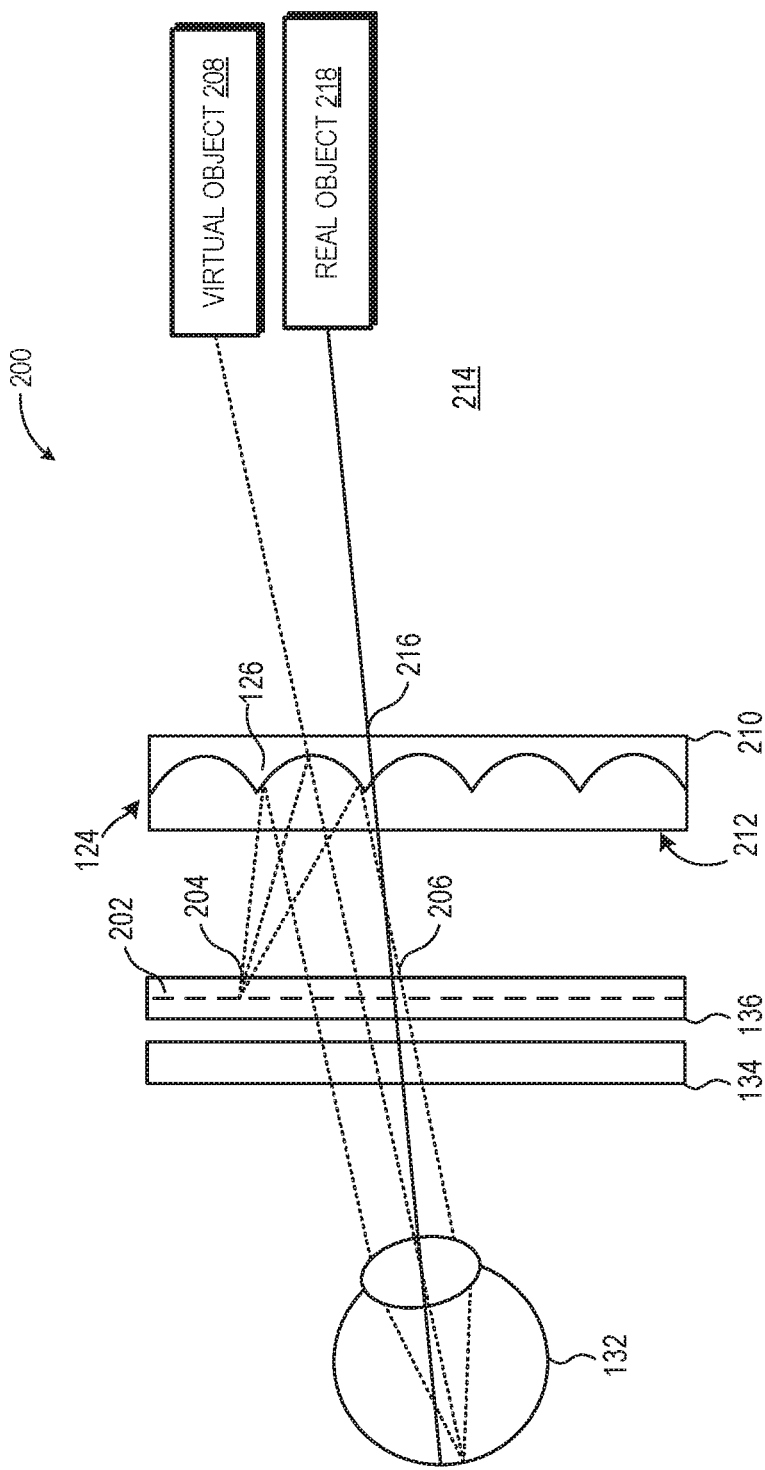
FIG. 2 is a diagram illustrating an example backlit light field display of the near-eye display system of FIG. 1 in accordance with some embodiments.

To further illustrate, FIG. 2 depicts a cross-section view 200 of an example backlit light field display such as the ones utilized in the near-eye display system 100 in accordance with some embodiments. As shown in this view, light emitted from the transparent backlight 134 passes through the transmissive display panel 136. In various embodiments, the transmissive display panel 136 is a transparent spatial light modulator (SLM) that receives incoming light from the transparent backlight 134. As discussed further herein, the modulation of light as it transmits through the SLM results in light emitted from the transparent backlight 134 to be replicated and/or diffracted, thereby becoming visible as a rainbow diffraction effect (e.g., such as caused by multiple higher diffraction orders).

In some embodiments, such as illustrated in FIG. 2, the transmissive display panel 136 includes an embedded grating 202 (or stacked with the transmissive display panel 136 rather than being embedded within) that operates to compensate for the effects of this diffraction. Because the SLM itself modulates the phase and/or the intensity of an incident light beam (i.e., the SLM itself acts as one grating), a pairing of the transmissive display panel 136 with the grating 202 can be modeled as a stacked pair of gratings (either amplitude or phase-gratings dependent upon the modulation performed by the SLM). Accordingly, by orienting the grating 202 such that it is shifted relative to the SLM and has the same pitch as the SLM, the higher diffraction orders cancel out, thereby eliminating or reducing the amount of rainbow diffraction effects.

In various embodiments, the curved beam splitter 126 is coated with an amplitude, spectral (i.e., wavelength-based), or polarization beam-splitter coating such as to be reflective. The light rays 204 passing through the transmissive display panel 136 are reflected by the curved beam splitter 126. The reflected light rays 206, which are collimated by the curved beam splitter 126, pass back through the transmissive display panel 136 and the transparent backlight 134 to be perceived by the eye 132 of the user. As shown, the reflected light rays 206 correspond to a virtual object 208. Although described in FIG. 2 in the context of curved beam splitters 126, those skilled in the art will recognize that optical elements capable of performing the above described collimation operation on the incoming light rays 204 from the transmissive display panel 136 may be utilized without departed from the scope of the present disclosure.

In some embodiments, rather than utilizing an array 124 of curved beam splitters 126 with physically curved surfaces having a beam splitter coating (and embedded in some substrate 210) as illustrated in FIG. 2, the beam splitter includes patterning diffractive reflectors on the substrate 210. Non-embedded optical elements also have the benefit of being easier, relative to substrate-embedded structures, to construct. For example, various holographic, thick/thin diffractive, Fresnel zone structures, or metamaterial nanophotonic array elements could be patterned (not shown) on the display panel facing surface 212 of the substrate 210. Similar to the curved beam splitters 126, such optical elements operate on amplitude, spectral (i.e., wavelength-based), or polarization beam-splitter behavior. In general, according to various embodiments, the beam splitter includes any optical element capable of collimating incoming light beams whether it be by reflection, refraction, or diffraction.

Light from the real world, such as a real world environment 214 in which the user is situated and towards which the eye gaze is directed, passes through the beam splitter array 124, the transmissive display panel 136, and then the transparent backlight 134 towards the eye 132. For example, light rays 216 associated with the real object 218 pass through the beam splitter array 124, the transmissive display panel 136, and then the transparent backlight 134 towards the eye 132. When the light rays 204 are redirected by the beam splitters 126 of the beam splitter array 124 towards the eye 132, the user also perceives virtual images. Thus, virtual imagery is superimposed over, or otherwise combined with, real world imagery to present augmented-reality (AR) and/or mixed-reality (MR) imagery to the user.

Figure 3D:
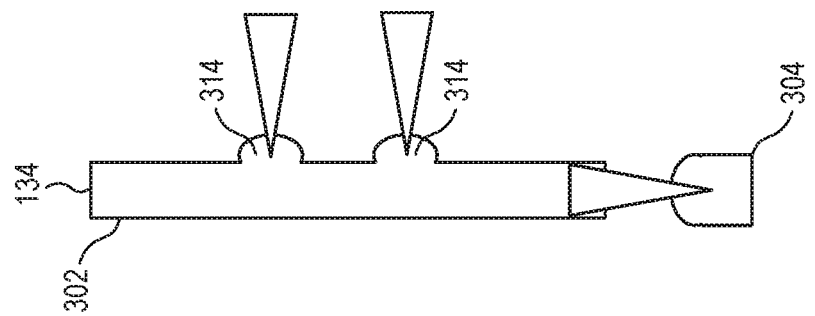
FIGS. 3A-3D illustrate cross-section views of example transparent backlights in the near-eye display system of FIG. 1 in accordance with some embodiments.
Figure 3C:
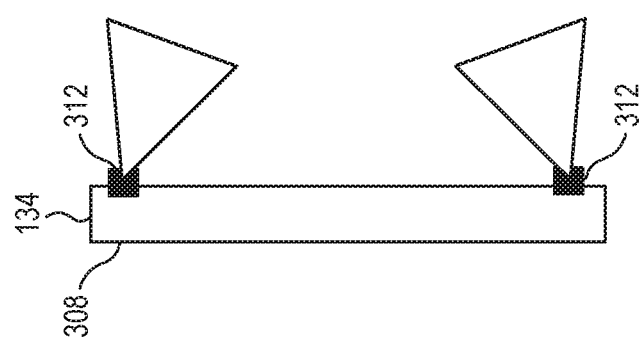
Figure 3B:
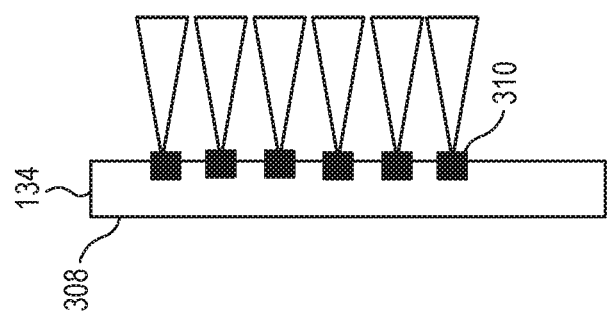
Figure 3A:
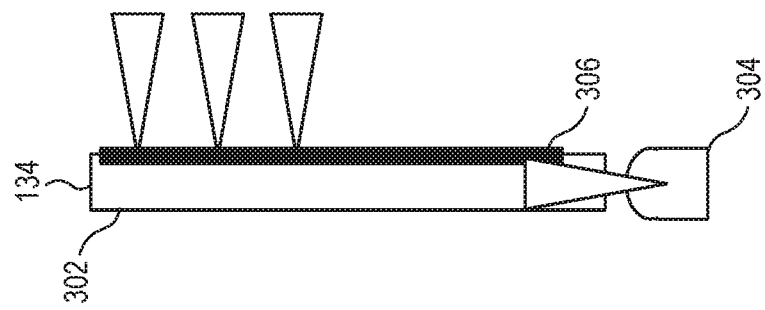

FIGS. 3A-3D illustrate cross-section views of example transparent backlights in the near-eye display system of FIG. 1 accordance with some embodiments. The transparent backlight 134 of FIG. 3A includes a planar waveguide 302 within which light from a light source 304, such as a red-green-blue (RGB) LED, undergoes total internal reflection. The planar waveguide 302 is coupled to a holographic out-coupler 306 and when light rays are incident upon the holographic out-coupler 306, the light rays are diffracted out of the planar waveguide 302 instead of being totally internal reflected. In another embodiment, the transparent backlight 134 of FIG. 3B includes a clear substrate 308 (e.g., plexiglass or acrylic material) upon which a sparse array of LED emitters 310 is patterned. Similarly, in the embodiment of FIG. 3C, the transparent backlight 134 includes a clear substrate 308 (e.g., plexiglass or acrylic material) upon which LEDs 312 are patterned. In this example, rather than having a sparse array that covers the entire substrate 308, a pair of broad LEDs 312 provide light to the entire SLM of the transmissive display panel (not shown) from outside the user's field of view. The embodiment of FIG. 3D is similar to that of FIG. 3A, in which the transparent backlight 134 includes a planar waveguide 302 within which light from a light source 304, such as a red-green-blue (RGB) LED, undergoes total internal reflection. However, instead of the planar waveguide 302 being coupled to a holographic out-coupler 306, the planar waveguide 302 includes a plurality of engineered surface defects 314 (e.g., illustrated as surface bumps in FIG. 3D but divots are also operable). When light rays are incident upon the plurality of engineered surface defects 314, the light rays are diffracted out of the planar waveguide 302 instead of being totally internal reflected. Thus, the transparent backlight 134 provides for presentation of light for virtual imagery generation while remaining transparent to the user.

Figure 4B:
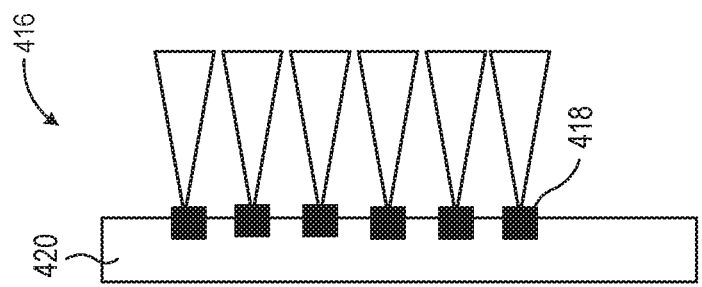
FIGS. 4A-4B illustrate cross-section views of example transmissive displays in the near-eye display system of FIG. 1 in in accordance with some embodiments.
Figure 4A:
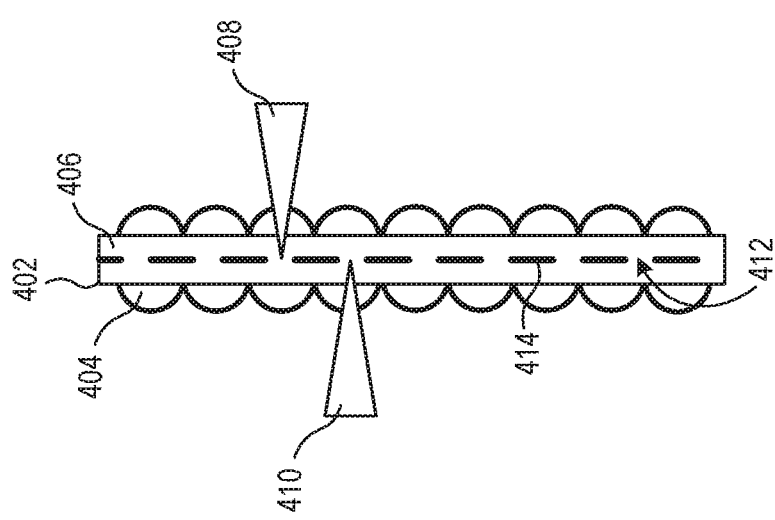

FIGS. 4A-4B illustrate cross-section views of example transmissive displays in the near-eye display system of FIG. 1 in in accordance with some embodiments. The transmissive display panel 402 of FIG. 4A includes an array of micro-lenslets 404 patterned on one or more surfaces of the transparent SLM 406 (e.g., SLM 136 of FIGS. 1-2). As illustrated, the micro-lenslets 404 are positioned such that the micro-lenslets 404 are configured to focus light passing through the SLM, such as light 408 emitted by the transparent backlight 134 towards the beam splitters 126 or light 410 reflected from the beam splitters 126 towards the user's eye 132. It should be recognized that less than the entirety of the surface area of each aperture 412 formed by the SLM 406 and grating 414 pair is active due to the presence of, for example, back-plane electronics (not shown) which limit the fill-factor of the transmissive display panel 402. However, patterning the pixel-scale micro-lenslets 404 such that light hitting the SLM 406 gets focused through the apertures 412 improves the effective fill-factor.

In other embodiments, rather than including the two discrete optical elements of the transparent backlight 134 and the transmissive display panel 136, the display panel 118 includes a singular optical element. For example, FIG. 4B illustrates a transparent organic light-emitting diode (OLED) display panel 416 which includes an array of OLED's 418 patterned on the surface of a transparent substrate 420 such that the pixels are actually emissive.

FIG. 5 is a diagram of light field encoding with transmissive displays in accordance with some embodiments. In the example of FIG. 5, the transparent backlight 134 includes a clear substrate 502 (e.g., plexiglass or acrylic material) upon which a sparse array of LED emitters 504 is patterned. Each of the LED emitters are spaced at about the pitch of the curved beam splitters 126. Thus, as shown in this view, each of the curved beam splitters 126 of the beam splitter array serves as a separate "projector" onto the eye, with each "projector" overlapping with one or more adjacent projectors in forming a composite virtual image (due to elemental images overlapping as they pass through the lens of the eye 132) from the array of elemental images 506 displayed by the display panel 118 (e.g., transparent backlight 134 and the transmissive display panel 136).

As shown, each of the LED emitters 504 is a RGB LED of a specific color. The resulting color field elemental images 506 also are each of one of the RGB colors due to the above-discussed configuration of one LED emitter 504 per curved beam splitter 126, such that a light field frame is encoded using contiguous color field elemental images. The RGB color field elemental images 506 enables spatial multiplexing of color (instead of temporal multiplexing, which saves frame rate. The light field frame already contains redundant pixels, so the RGB component breakup allows use of adjacent elemental images to provide different color information without visibly decreasing resolution.

The RGB lightfield encoding is also more photon efficient, as each RBG LED emitter 504 is fully emissive and does not include, for example, absorptive Bayer filters that performs sub-pixel divisions to filter light by wavelength range. When passing light using absorptive filters, approximately two-thirds of light intensity is filtered out to pass one of the three colors. Thus, light field encoding using color field elemental images is more computationally efficient than filter-based systems, as the information throughput loss is decreased relative to systems that use absorptive filters.

Figure 6:
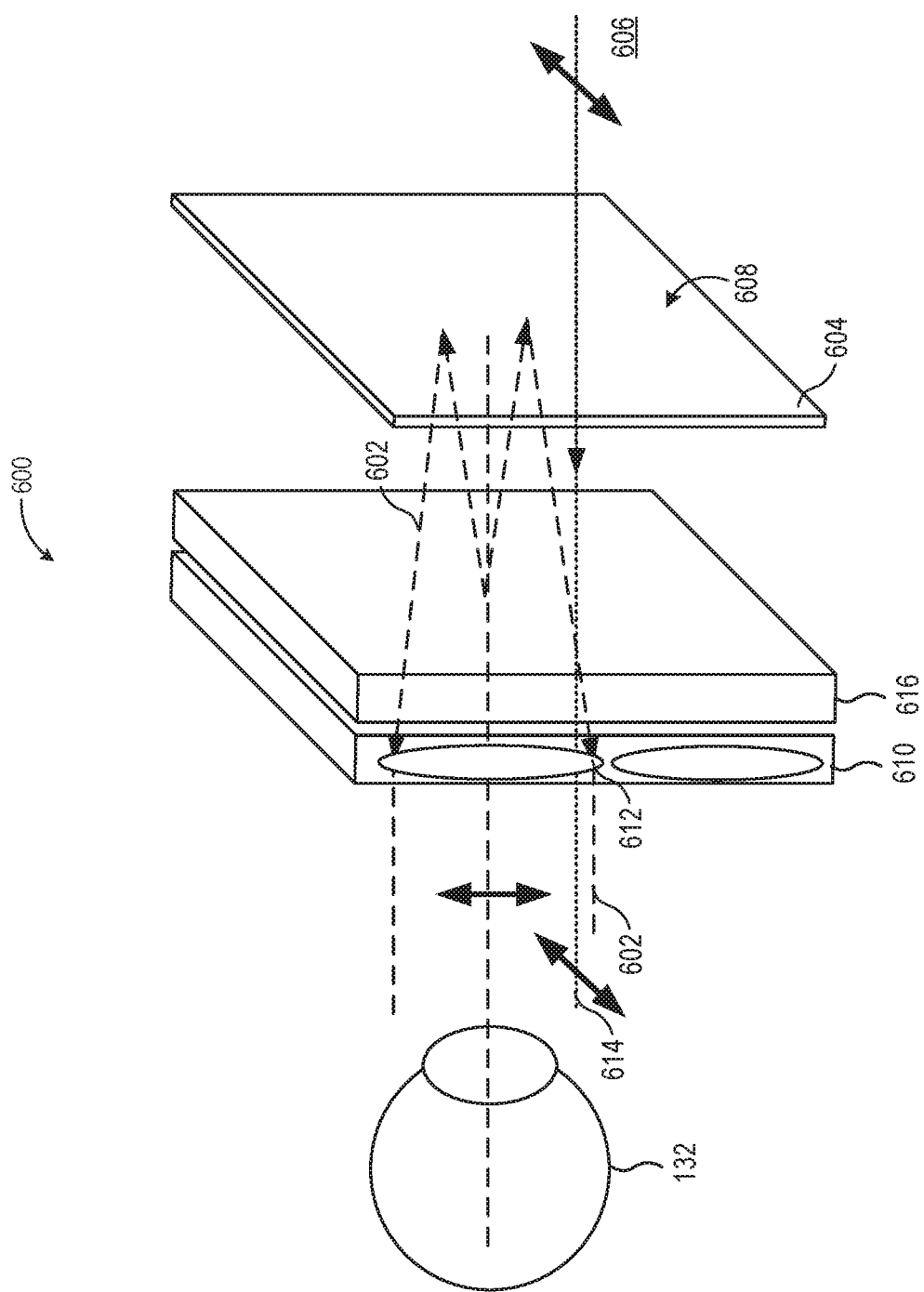
FIG. 6 is a diagram of an example birefringent lens array for light field display such as the ones utilized in the near-eye display system of FIG. 1 in accordance with some embodiments.

FIG. 6 is a diagram of a perspective view 600 of an example birefringent lens array for light field display such as the ones utilized in the near-eye display system 100 in accordance with some embodiments. As shown in this view, light rays 602 emitted from the transparent OLED display panel 616 (e.g., transparent OLED display panel 416 of FIG. 4) reflects off a wire grid polarizer 604. The wire grid polarizer 604 includes many parallel metallic wires (not shown) that are placed in a plane. The wire grid polarizer 604 mostly reflects non-transmitted polarization and is used as a polarizing beam splitter.

For example, in one embodiment, the light rays 602 emitted from the transparent OLED display panel 616 is polarized in the vertical direction (i.e., polarized in the S-wave direction). Electromagnetic waves which have a component of their electric fields aligned parallel to the metallic wires will induce the movement of electrons along the length of the wires. Since the electrons are free to move in this direction, the polarizer behaves in a similar manner to the surface of a metal when reflecting light, and the wave is reflected. However, for electromagnetic waves with electric fields perpendicular to the metallic wires, the electrons cannot move very far across the width of each wire. Therefore, little energy is reflected and the incident wave is passes through without reflection. The wire grid polarizer 604 therefore operates like a mirror for vertical polarization and passes horizontally polarized light. In another embodiment, the light rays 602 emitted from the transparent OLED display panel 616 is polarized in the horizontal direction (i.e., polarized in the P-wave direction). The wire grid polarizer 604 in that embodiment therefore has its metallic wires rotated ninety degrees such that the wire grid polarizer 604 operates like a mirror for horizontal polarization and passes vertically polarized light.

Light in the real world 606 (e.g., a real world environment in which the user is situated) is generally unpolarized, and has equal components of the S-wave and P-wave states. Thus, light in the real world 606 that is in the P-wave state (i.e., horizontally polarized) passes through the wire grid polarizer 604. Light in the real world 606 that is in the S-wave state (i.e., vertically polarized) reflects off the real world facing surface 608 of the wire grid polarizer 604 back to the surrounding real world environment. However, this results in loss of half the amount of world light that is passed through to the eye 132 of the user.

The near-eye display system also includes a birefringent lens array 610 positioned between the user's eye 132 and the transparent OLED display panel 616. In some embodiments, the birefringent lens array 610 includes birefringent lenses 612 having liquid crystal molecules oriented such as to form a birefringent material having a refractive index that depends on the polarization and propagation direction of light. Although described here specifically in the context of liquid crystal birefringent lenses, any birefringent material may be used without departing from the scope of this disclosure. For example, in other embodiments, the birefringent lens array 610 includes birefringent lenses 612 including nanophotonic or metamaterials engineered to exhibit birefringence.

The birefringent lenses 612 operate as collimating lenses for one polarization state and passes light straight through without bending for another polarization state. In particular, as shown in FIG. 6, the birefringent lenses 612 pass the horizontally polarized world light 614 (i.e., P-wave state). Thus, the horizontally polarized world light 614 passes through all of the wire grid polarizer 604, the transparent OLED display panel 616, and the birefringent lens array 610 without interference, thereby enabling the eye 132 to perceive the real world 606 without optical interference. In contrast, as shown in FIG. 6, the birefringent lenses 612 collimate the vertically polarized light 602 (i.e., S-wave state). Thus, the vertically polarized light 602, after being emitted from the OLED display panel 616 and reflected by the wire grid polarizer 604, is collimated and presented to the eye 132 as virtual imagery overlaid real world imagery.

It should be recognized that systems described herein include embodiments (e.g., as described relative to FIGS. 2 and 6 in more detail) in which the light being encoded passes through the SLM twice. For example, when tracing the path of light photons emitted by one pixel in FIG. 2, the light rays 204 from that pixel travel in a cone of light. The light rays 204 hit the curved beam splitter 126 and are subsequently reflected back towards the eye 132 approximately collimated. Accordingly, the light (which contains image data) for that one pixel becomes multiplexed with the light of its neighboring pixels in Fourier space, which can cause reconstruction artifacts referred to herein as "double-pass reconstruction artifacts."

In some embodiments, the perceptibility of double-pass reconstruction artifacts is reduced by reducing the contrast of a source image being encoded in its central region. For example, the contrast is reduced in the central portion of each of the color field elemental images while tapering the amount of contrast reduction to the original source image contrast at the edges of each elemental image. By reducing the contrast of the central group of pixels in each elemental image, the perceptibility of double-pass reconstruction artifacts in the resulting light field frame is reduced.

Figure 7:
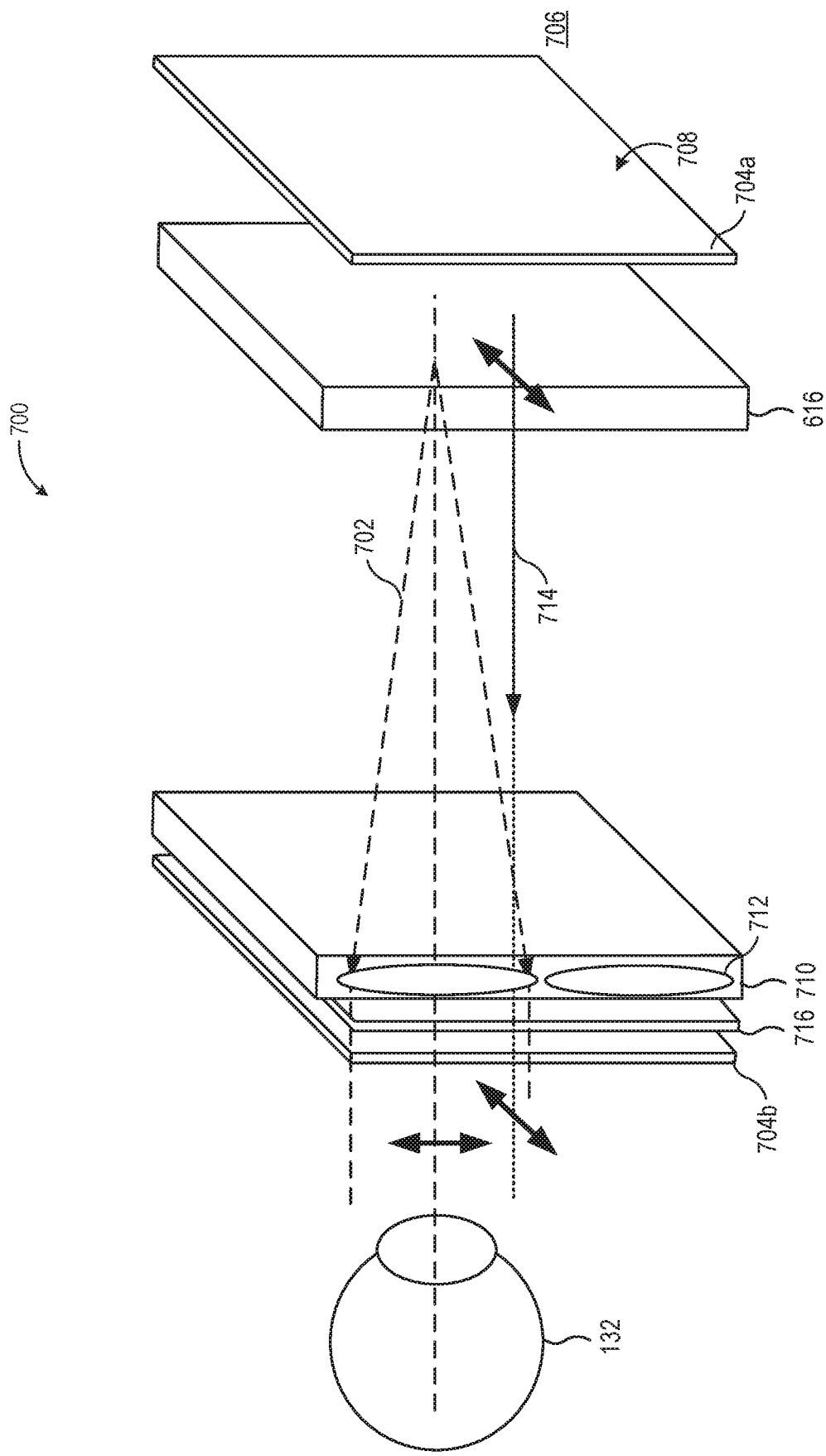
FIG. 7 is a diagram of an example variable polarization rotator for light field display such as the ones utilized in the near-eye display system of FIG. 1 in accordance with some embodiments.

In a different embodiment, to avoid the double path of the light rays 602 of FIG. 6 (i.e., both leaving and entering the OLED display panel 616), FIG. 7 illustrates a diagram of a perspective view 700 of an example variable polarization rotator for light field display such as the ones utilized in the near-eye display system 100 in accordance with some embodiments. The embodiment in FIG. 6 of positions the OLED display panel 616 at a distance of half focal length away from the birefringent lens array 610 and reflecting light rays 602 off the wire grid polarizer 604, which may result in double-path artifact issues. In contrast, the embodiment in FIG. 7 positions the OLED display panel 616 at a distance of half focal length away from the birefringent lens array 610.

As shown in FIG. 7, the near-eye display system includes a first wire grid polarizer 704a similar to that of wire grid polarizer 604 in FIG. 6. The first wire grid polarizer 704a filters light in the real world 706 such that horizontally polarized light (i.e., P-wave state) passes through the first wire grid polarizer 704a while vertically polarized light (i.e., S-wave state) reflects off the real world facing surface 708 of the first wire grid polarizer 704a back to the surrounding real world environment. The horizontally polarized world light 714 (i.e., P-wave state) passes through the birefringent lenses 712 of birefringent lens array 710 without optical interference. Subsequently, the horizontally polarized world light 714 passes through a second wire grid polarizer 704b and reaches the eye 132 unaffected.

However, the light rays 702 emitted from the OLED display panel 616 is unpolarized light and has components of both the S-wave and P-wave states. Half of the unpolarized light rays 702 gets refracted by the birefringent lens array 710 (i.e., the vertically polarized S-wave state light) and half of the unpolarized light rays 702 (i.e., the horizontally polarized P-wave state light) passes through similar to that of the horizontally polarized world light 714. The horizontally polarized P-wave state light rays represents out-of-focus light for virtual imagery, which is blocked by a variable half wave plate 716. The variable half wave plate 716 operates as a polarization rotator such that the polarization of the unpolarized light rays 702 is rotated. In this manner, the previously vertically polarized S-wave state light containing desired virtual imagery data gets rotated to the P-wave state so that it can pass through the second wire grid polarizer 704b and reach the eye 132 to be perceived as virtual imagery overlaid real world imagery. In contrast, the previously horizontally polarized P-wave state light representing out-of-focus light gets rotated to the S-wave state so that it is blocked from reaching the eye 132. Accordingly, the variable half wave plate 716 is actively controlled to dedicate a portion (e.g., approximately half) of its operating time to passing real world 706 imagery and another portion (e.g., approximately half again) of its operating time to modulating and passing virtual world imagery.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A near-eye display system, comprising:
   a transmissive display panel to display a near-eye light field frame comprising an array of elemental images, wherein each elemental image of the array of elemental images represents a view of an object or scene from a different corresponding viewpoint, and wherein the transmissive display panel is transparent to light; and
   a beam splitter array to collimate light rays of the near-eye light field frame for presentation to a user's eye.

2. The near-eye display system of claim 1, the transmissive display panel comprising:
   a transparent backlight; and
   a transparent spatial light modulator (SLM) that receives light rays from the transparent backlight prior to transmission to the beam splitter array.

3. The near-eye display system of claim 2, wherein the transparent spatial light modulator further comprises a grating embedded within the spatial light modulator configured to cancel out higher order diffracted wavelengths resulting from light transmission through the transparent spatial light modulator.

4. The near-eye display system of claim 2, the transparent backlight comprising:
   a planar waveguide that receives light rays from a light source; and
   a holographic out-coupler configured to diffract the light rays out of the planar waveguide for transmission to the transparent spatial light modulator.

5. The near-eye display system of claim 2, the transparent backlight comprising:
   a planar waveguide that receives light rays from a light source, wherein the planar waveguide includes a plurality of surface defects configured to diffract the light rays out of the planar waveguide for transmission to the transparent spatial light modulator.

6. The near-eye display system of claim 2, the transparent backlight comprising:
   an array of single color LED emitters patterned on a SLM-facing surface of a transparent substrate.

7. The near-eye display system of claim 6, wherein the array is arranged such that each of the single color LED emitters are spaced at approximately the pitch of beam splitters in the beam splitter array.

8. The near-eye display system of claim 6, wherein each elemental image of the array of elemental images corresponds light emitted from an individual one of the single color LED emitters.

* * * * *